US012270533B2

(12) United States Patent
Zhang et al.

(10) Patent No.: US 12,270,533 B2
(45) Date of Patent: Apr. 8, 2025

(54) LIGHTING APPARATUS

(71) Applicant: LEEDARSON LIGHTING CO.,LTD., Fujian (CN)

(72) Inventors: Zexin Zhang, Fujian (CN); Siliang Wu, Fujian (CN); Lei Zhang, Fujian (CN); Zhirong Xie, Fujian (CN); Linhua Wang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/229,559

(22) Filed: Aug. 2, 2023

(65) Prior Publication Data

US 2024/0377051 A1 Nov. 14, 2024

(30) Foreign Application Priority Data

May 12, 2023 (CN) ......................... 202321139800.2

(51) Int. Cl.

| | |
|---|---|
| ***F21V 23/00*** | (2015.01) |
| ***F21V 3/00*** | (2015.01) |
| ***F21V 17/10*** | (2006.01) |
| ***F21V 23/06*** | (2006.01) |
| ***F21Y 115/10*** | (2016.01) |

(52) U.S. Cl.

CPC .............. *F21V 23/008* (2013.01); *F21V 3/00* (2013.01); *F21V 17/10* (2013.01); *F21V 23/06* (2013.01); *F21Y 2115/10* (2016.08)

(58) Field of Classification Search

CPC .......... F21V 23/008; F21V 3/00; F21V 17/10; F21V 23/06; F21V 31/005; F21Y 2115/10; F21Y 2106/16; F21Y 2105/16; F21S 8/08; F21S 8/046

See application file for complete search history.

(56) References Cited

U.S. PATENT DOCUMENTS 3,213,751 A * 10/1965 Benjamin ................. F21V 3/00 362/330
11,719,969 B2 * 8/2023 Han .................. G02F 1/133325 361/807
2022/0018517 A1 * 1/2022 Luo ........................... F21V 7/04

FOREIGN PATENT DOCUMENTS

CN 108386763 * 8/2018 ................ F21S 8/00
EP 3657071 * 6/2022 .......... F21Y 2115/10

OTHER PUBLICATIONS

CN 108386763, Aug. 10, 2018, Yan-Ting Zhou, English Translation (Year: 2018).*

* cited by examiner

*Primary Examiner* — Jong-Suk (James) Lee
*Assistant Examiner* — Peggy A Neils
(74) *Attorney, Agent, or Firm* — Chun-Ming Shih; LANWAY IPR SERVICES

(57) ABSTRACT

A lighting apparatus includes a light source, a bottom tray, an optical plate and a waterproof adhesive tape. The light source is placed upon the bottom plate. The bottom tray has a bottom plate, a lateral wall and a folded structure. The lateral wall defines a light opening. The folded structure is disposed at a top edge of the lateral wall. An optical plate is placed to cover the light opening to change a light parameter of a light emitted from the light source. At least a portion of a waterproof adhesive tape and a peripheral edge of the optical plate are stacked together to be fastened by the folded structure of the bottom tray.

18 Claims, 11 Drawing Sheets

LIGHTING APPARATUS

FIELD

The present invention is related to a lighting apparatus, and more particularly related to a lighting apparatus with a compact design.

BACKGROUND

Panel light devices have become increasingly popular due to their numerous advantages over traditional lighting fixtures. One key advantage is their exceptional energy efficiency. These lights consume less power while providing the same or even superior illumination compared to conventional sources. As a result, panel lights contribute to significant energy cost savings and help reduce the overall environmental impact, making them an environmentally friendly lighting option.

Another significant advantage of panel lights is their ability to provide even and uniform illumination. They are designed to produce soft and diffused light, minimizing shadows and glare. This characteristic creates a comfortable and pleasant environment, making panel lights ideal for various applications, including offices, schools, and other indoor spaces where consistent lighting is essential.

The slim and sleek design of panel lights is also a major attraction. Their minimalist appearance complements modern interior spaces, adding a touch of elegance to any environment. This aesthetic appeal makes them a popular choice for both residential and commercial settings.

In addition to their design, panel lights boast a long lifespan. High-quality panel lights can last for thousands of hours of operation, resulting in reduced maintenance and replacement costs. This longevity is particularly advantageous in commercial or large-scale installations where frequent replacements can be costly and time-consuming.

Panel lights offer great versatility in terms of size, shape, and color temperature options. This flexibility allows them to be used for various lighting purposes, from general illumination to task lighting and even as decorative elements. Their adaptability makes them suitable for a wide range of applications in different settings.

Many panel light models are dimmable, providing users with the ability to adjust the brightness as needed. Dimming capabilities not only allow for personalized lighting preferences but also contribute to additional energy savings when the lights are not required at full brightness.

Finally, panel lights are relatively easy to install, which saves time and effort during setup. They can be recessed into ceilings, surface-mounted, or suspended, depending on the specific requirements of the space. This ease of installation makes them a convenient choice for both professional electricians and DIY enthusiasts.

Due to these advantages, panel light devices are widely used in various settings. They are commonly found in commercial spaces such as offices, retail stores, and educational institutions, where uniform and glare-free lighting is essential. Panel lights are also prevalent in healthcare facilities, hospitality venues, and residential homes, where they contribute to creating comfortable and welcoming environments. Additionally, industrial and commercial facilities utilize panel lights to ensure efficient and reliable lighting for work safety and productivity.

In conclusion, panel light devices offer numerous benefits, including energy efficiency, even illumination, sleek design, long lifespan, versatility, and ease of installation. Their widespread use in various applications makes them a popular and practical lighting solution in today's modern world.

Waterproofing is a critical aspect of light device design, especially for those exposed to outdoor environments or potentially damp conditions. These devices often contain delicate electronic components such as LED chips, circuit boards, and power sources that are susceptible to damage when in contact with moisture. By incorporating waterproofing measures, designers can shield these components from rain, humidity, accidental spills, or other sources of water, thus preventing corrosion and potential short circuits.

Beyond safeguarding the internal electronics, waterproofing also contributes to the overall longevity and durability of light devices. Exposure to harsh environmental conditions can lead to premature wear and tear, resulting in the need for frequent repairs or replacements. By ensuring that the device is adequately sealed against water intrusion, manufacturers can extend its lifespan and reduce maintenance costs, making it more reliable for users in the long run.

Safety is another paramount consideration in light device design, and waterproofing plays a significant role in this aspect as well. Moisture seepage into the electrical components of a light device can create potential electrical hazards, such as shocks or fires. Waterproofing measures help mitigate these risks, protecting both the device and its users from any potential harm. This is particularly important for devices used in outdoor settings or marine applications, where they may be exposed to water on a regular basis.

Moreover, the performance consistency of light devices is heavily influenced by their ability to resist water infiltration. Moisture can alter the optical properties of these devices, leading to decreased brightness, color shifts, or diffusion issues. By maintaining the integrity of optical components through waterproofing, designers can ensure that the device delivers consistent and reliable performance over time, meeting the expectations of users and preserving its functionality.

Waterproofing also enables light devices to be used reliably in a variety of environments. From outdoor lighting fixtures to underwater applications, having a waterproof design ensures that the device can function effectively and withstand challenging conditions. This versatility expands the range of potential use cases for the device, making it adaptable to different industries and consumer needs.

Finally, adherence to waterproofing standards and certifications is essential for light devices, especially in industries with strict regulations. Meeting these requirements ensures the device's suitability for intended use and demonstrates compliance with safety and quality standards. Customers and end-users can have confidence in the device's performance and safety when it has undergone rigorous testing and received relevant certifications.

In conclusion, waterproofing is a fundamental consideration in light device design due to its role in protecting sensitive electronics, ensuring longevity and durability, maintaining performance consistency, guaranteeing safety, enabling use in diverse environments, and meeting regulatory requirements. By incorporating effective waterproofing measures, manufacturers can create reliable, long-lasting, and safe light devices suitable for a wide range of applications.

A poorly waterproofed LED lighting fixture can result in significant damage to its internal components. LEDs (Light-Emitting Diodes) are sensitive electronic devices that require protection from moisture and water. When water infiltrates the fixture due to inadequate waterproofing, it can lead to a host of problems that may compromise the functionality and longevity of the LED components.

Firstly, water can cause corrosion on the metal contacts and circuit boards within the LED fixture. Corrosion can disrupt the electrical connections, leading to flickering or intermittent operation of the LED lights. Over time, this corrosion can worsen, causing permanent damage to the electronic components and rendering the fixture inoperable.

Secondly, water can create short circuits in the LED fixture. When water comes into contact with live electrical components, it can form a conductive path, leading to short-circuiting. This can cause excessive heat generation and may even lead to fire hazards. A poorly waterproofed fixture increases the risk of such electrical malfunctions, posing safety concerns to both users and the surrounding environment.

Moreover, moisture can adversely affect the performance of LED chips. LEDs operate by passing an electric current through semiconductor materials to produce light. When moisture penetrates the LED package, it can alter the characteristics of the semiconductor materials, resulting in reduced brightness, color shifts, and even premature failure of the LED chips. This compromises the quality of light emitted and can lead to a significant decrease in the LED fixture's overall lifespan.

In addition to causing direct damage to the LED components, water infiltration can accelerate the degradation of other materials used in the fixture's construction. For instance, it can cause deterioration of adhesives, seals, and thermal management materials, further exacerbating the deterioration of the LED fixture over time.

Another consequence of bad waterproofing is the voiding of warranties and increased maintenance costs. Manufacturers often provide warranties for LED fixtures under specific conditions, and one common condition is that the fixture must not be subjected to water damage. If water infiltration occurs due to poor waterproofing, the warranty may become void, leaving the user responsible for repair or replacement costs.

In conclusion, bad waterproofing in LED lighting fixtures can cause extensive damage to the LED components. Corrosion, short circuits, reduced performance, and voided warranties are some of the potential consequences of water infiltrating the fixture. Proper waterproofing measures are essential to protect the sensitive electronic components of the LED fixture and ensure its optimal performance and longevity. By investing in high-quality, well-sealed LED fixtures, users can avoid potential problems and enjoy the benefits of reliable, long-lasting, and safe lighting solutions.

Therefore, it is beneficial to design compact panel light with well waterproof function while keeping in low cost.

SUMMARY

In some embodiments, a lighting apparatus includes a light source, a bottom tray, an optical plate and a waterproof adhesive tape.

The light source is placed upon the bottom plate.

The bottom tray has a bottom plate, a lateral wall and a folded structure.

The lateral wall defines a light opening.

The folded structure is disposed at a top edge of the lateral wall.

An optical plate is placed to cover the light opening to change a light parameter of a light emitted from the light source.

At least a portion of a waterproof adhesive tape and a peripheral edge of the optical plate are stacked together to be fastened by the folded structure of the bottom tray.

In some embodiments, the lighting apparatus may also include a driver module attached to an exterior side of the lateral wall of the bottom tray.

In some embodiments, the driver module is installed by sliding into a track of the bottom tray.

In some embodiments, the track has an electrode and a buckle.

When the driver module is moved to the electrode, the buckle secures an electrical contact between the driver module and the light source via the electrode.

In some embodiments, the driver module has a window for exposing a sensor to collect ambient information to be processed by the driver module.

In some embodiments, the window is also used for exposing an antenna for wireless communication of the driver module.

In some embodiments, the folded structure defines a surrounding U-shaped clip.

The portion of the waterproof adhesive tape and the peripheral edge of the optical plate are clipped inside the U-shaped clip.

In some embodiments, the folded structure is the topmost component, and there is no other frame to cover this folded structure.

In some embodiments, the folded structure construct a surrounding frame.

In some embodiments, areas defined by the lateral wall of the bottom tray increases gradually from the bottom plate of the bottom tray to the folded structure of the bottom tray.

In some embodiments, a rate of increase of at the areas becomes greater as the areas get closer to the folded structure.

In some embodiments, a ratio of a lateral wall height to a length of the bottom plate is less than 1/50.

In some embodiments, there are multiple grooves disposed on the bottom plate.

The light source includes multiple light strips.

The light strips are respectively disposed to the grooves.

In some embodiments, each light strip has a lens cover.

The lens cover has a buckle unit for buckling to the the bottom plate.

In some embodiments, a concave platform is disposed at a center of the bottom plate.

A driver module is placed on the concave platform.

At least of a portion of the driver module is placed in a lower height position compared with the light strips.

In some embodiments, there are multiple ribs raised form the bottom plate.

The light source has multiple light strips placed on the ribs.

In some embodiments, a forming fixture is used for deforming the folding structure when the portion of the waterproof adhesive tape and the peripheral edge of the optical plate is placed in the folder structure to also deform the portion of the waterproof adhesive tape and the peripheral edge of the optical plate to fasten the optical plate with the bottom plate.

In some embodiments, the waterproof adhesive tape is a rubber loop.

In some embodiments, the optical plate is a diffusion panel.

In some embodiments, the optical plate contains multiple diffusion particles.

The multiple diffusion particles have a diameter less than 0.1 mm.

DETAILED DESCRIPTION

Figure 8:
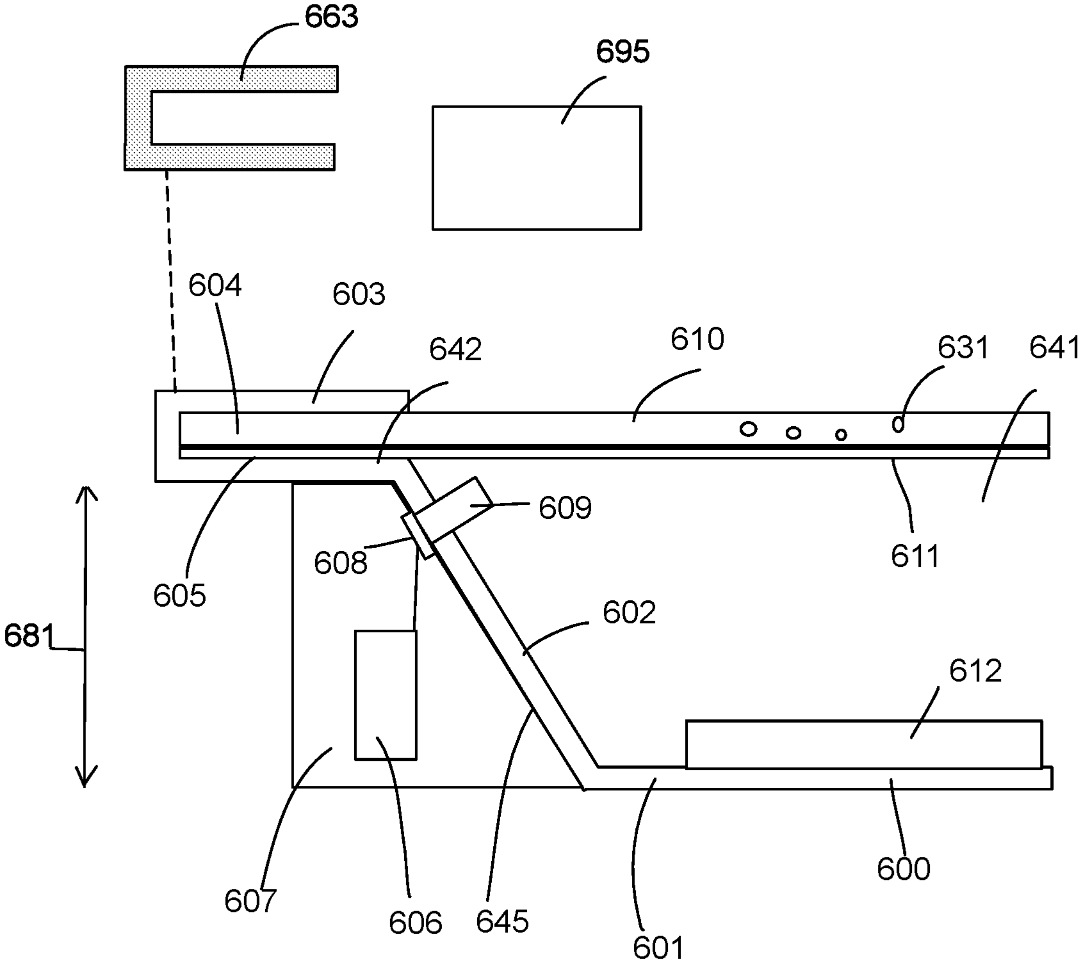
FIG. 8 illustrates a portion of component relation in a lighting apparatus embodiment.

FIG. 8 shows a cross-sectional view of a portion of a lighting apparatus embodiment. In FIG. 8, a lighting apparatus includes a light source 612, a bottom tray 600, an optical plate 610 and a waterproof adhesive tape 611.

The light source 612 may be a light strip with multiple LED modules, or refers to a set of LED modules distributed and placed upon the bottom plate 601.

The light source 612 is placed upon the bottom plate 601 of the bottom tray 600.

The bottom tray 600 has a bottom plate 601, a lateral wall 602 and a folded structure 603.

The lateral wall 602 defines a light opening 641. When the bottom tray 601 has a shape of rectangular shape, the bottom tray 601 has the light opening 641 of rectangular shape facing upwardly.

The folded structure 603 is disposed at a top edge 642 of the lateral wall 602.

An optical plate 610 is placed to cover the light opening 641 to change a light parameter of a light emitted from the light source 612.

At least a portion 605 of a waterproof adhesive tape 611 and a peripheral edge 604 of the optical plate 610 are stacked together to be fastened by the folded structure 603 of the bottom tray 600.

In some embodiments, the bottom tray 600 is made of a single piece of metal or plastic material. In such case, the folded structure 603 is used as a frame and in such case, no additional frame is needed, thus lowering down the overall cost.

In some embodiments, the lighting apparatus may also include a driver module 607 attached to an exterior side 645 of the lateral wall 602 of the bottom tray 600.

As a tray, the bottom tray 601 has a shallow containing space defined by its lateral wall 602. When the lateral wall 602 extends from the bottom plate 601 with a slope, there is a external space covered by the lateral wall from a view angle as illustrated in FIG. 8.

With such configuration, the driver module 607 does not add overall thickness of the lighting apparatus and furthermore, the driver module 607 is concealed and protected by the structure of the bottom tray 600.

In some embodiments, the driver module is installed by sliding into a track of the bottom tray.

Figure 9:
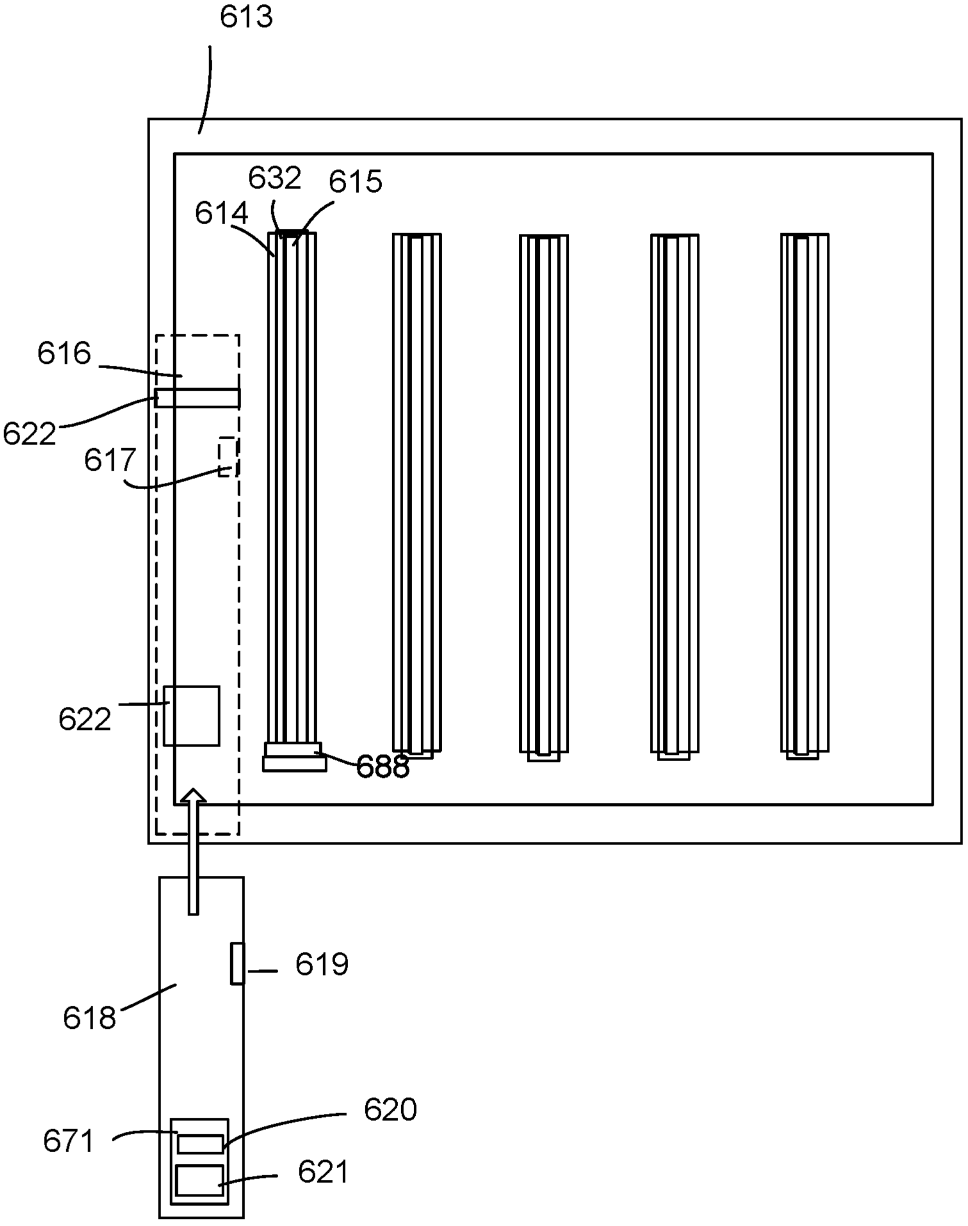
FIG. 9 illustrates components and their position relation from a top view showing another example.

FIG. 9 shows such an example, In FIG. 9, the driver module 618 is sliding into the track 616. The track structure may be made by attaching some bars or levers to the lateral wall of the bottom tray. In some embodiments, a bending portion for a customized size may form the track 616.

In the example of FIG. 9, the track 616 has an electrode 617 and a buckle 622.

When the driver module 618 is moved toward the electrode 617 so that an electrode 619 of the driver module 618 is electrically connected to the electrode 617, the buckle 616 secures an electrical contact between the driver module and the light source via the electrode 617.

For example, when the driver module 618 is inserted to a position for electrical connection between the driver module 618 and the light source 632, the buckle 622 is used for secure the position relation between the driver module 616 and the In some embodiments, the driver module 618 has a window 671 for exposing a sensor 620 to collect ambient information to be processed by the driver module and the bottom tray 613.

For example, the sensor 620 may be a motion sensor, a smoke detector, a camera, a light sensor and/or other sensors for collecting information.

In some embodiments, the window 671 is also used for exposing an antenna 621 for wireless communication of the driver module 618.

In FIG. 8, the folded structure 603 defines a surrounding U-shaped clip, as highlighted in the U-shaped clip 663.

The portion 605 of the waterproof adhesive tape 61 and the peripheral edge 604 of the optical plate 610 are clipped inside the U-shaped clip.

In some embodiments, the folded structure is the topmost component, and there is no other frame to cover this folded structure.

In other designs available in the market, an additional frame usually needs to be added to fix a diffusion plate. In contrast, the embodiments disclosed here have significant cost advantages.

In some embodiments, the folded structure construct a surrounding frame, as clearly illustrated in FIG. 9. Please be noted that although rectangular shape is used as illustration, circular shape, other polygonal shapes and/or other shapes may be implemented to meet different requirements.

In some embodiments, areas defined by the lateral wall of the bottom tray increases gradually from the bottom plate of the bottom tray to the folded structure of the bottom tray. In some embodiments, a rate of increase of at the areas becomes greater as the areas get closer to the folded structure.

Figure 10:
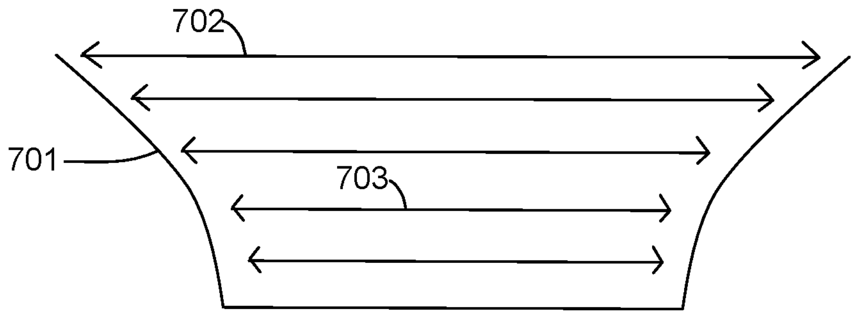
FIG. 10 shows a profile of a side view for illustrating lateral wall.

FIG. 10 shows a diagram illustrating there is an area defined by lateral walls 701. In FIG. 10, the areas defined by the lateral wall 701 is increasing gradually from bottom (the end close to the bottom plate) to top end (the end close to the folded structure).

In some embodiments, a ratio of a lateral wall height to a length of the bottom plate is less than 1/5.

In FIG. 8, the height 681 of the lateral wall 608. When compared the height 681 to the length of the bottom plate 601 and its ratio is less than 1/5, which means a thin panel light device is discussed, the folded structure for installing the optical plate is particularly helpful, because at least if an additional frame is added, additional height is raised.

In some embodiments, there are multiple grooves disposed on the bottom plate.

The light source includes multiple light strips.

The light strips are respectively disposed to the grooves.

Figure 11:
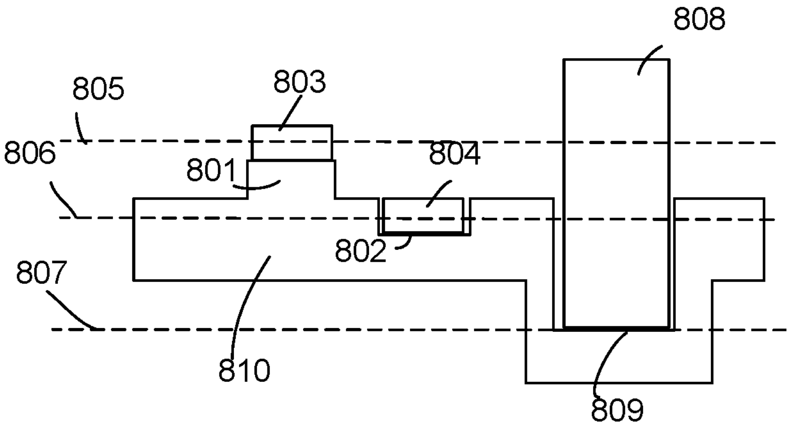
FIG. 11 shows positions among components with an example.

FIG. 11 illustrates a position relation example among components mentioned above. In FIG. 11, the bottom plate 810 has some concave portion as the groove 802 mentioned above. The light strip 804 is placed in the groove 802. Such design helps easy alignment and positioning of the light strip 804.

In some embodiments, each light strip has a lens cover.

In FIG. 9, the light strip 615 has a lens cover 632. The light strip 615 may be integrated with the lens cover 632 as a module placed in a groove 614.

The lens cover 632 has a buckle unit 688 for buckling to the the bottom plate of the bottom tray 613.

In FIG. 11, a concave platform 809 is disposed at a center of the bottom plate 810.

A driver module 808 is placed on the concave platform 809.

At least of a portion of the driver module 808 is placed in a lower height position compared with the light strips 804, as illustrated in FIG. 11.

In some embodiments, there are multiple ribs raised form the bottom plate.

FIG. 11 illustrates a rib 801 rising above the bottom plate 810 for placing a light strip 803.

The light source has multiple light strips placed on the ribs.

In FIG. 8, a forming fixture 695 is used for deforming the folding structure 603 when the portion 605 of the waterproof adhesive tape 611 and the peripheral edge 604 of the optical plate 610 is placed in the folder structure 603 to also deform the portion of the waterproof adhesive tape and the peripheral edge of the optical plate to fasten the optical plate with the bottom plate.

Figure 5:
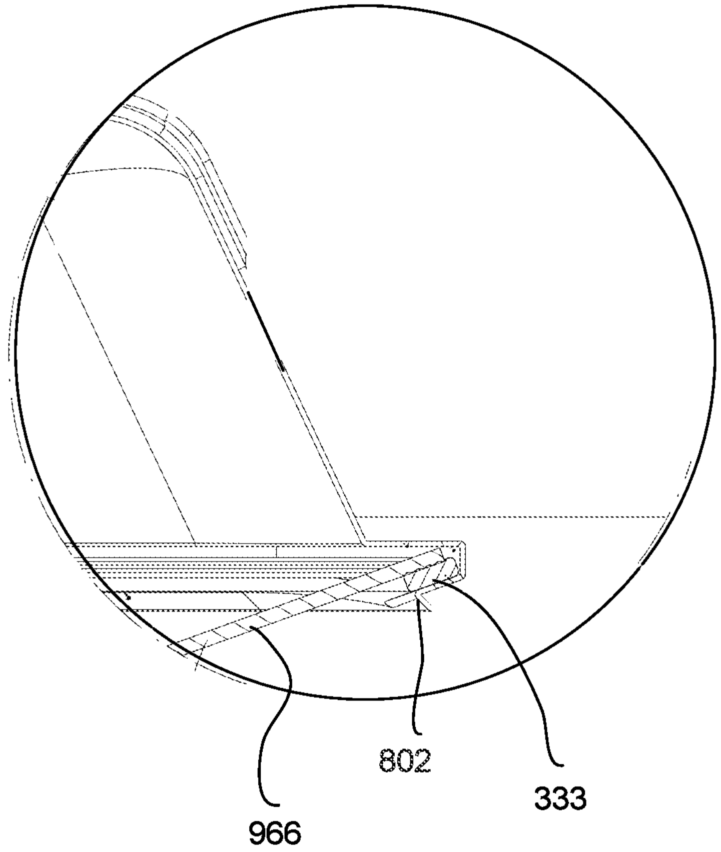
FIG. 5 illustrates a zoom-up view of a cross-sectional view of a connection of components during assembly.

FIG. 5 illustrates that an optical plate 4 is firstly inserted into a folded structure 333. Usually, an optical plate 4 is made of plastic and can be deformed for a certain degree so that it can be inserted into a U-shape clip mentioned above. After the optical plate 4 is inserted, the folded structure may be deformed by applying an external force, e.g. with the forming fixture.

In some embodiments, the waterproof adhesive tape is a rubber loop.

In some embodiments, the optical plate is a diffusion panel.

In FIG. 8, the optical plate 610 contains multiple diffusion particles 631.

The multiple diffusion particles have a diameter less than 0.1 mm. These diffusion particles are mixed in a transparent plastic material. It is found that when the particles with diameters smaller than 0.1 mm, the overall diffusion effect is optimized particular for a panel light with a diameter between 10 cm to 60 cm.

Figure 1:
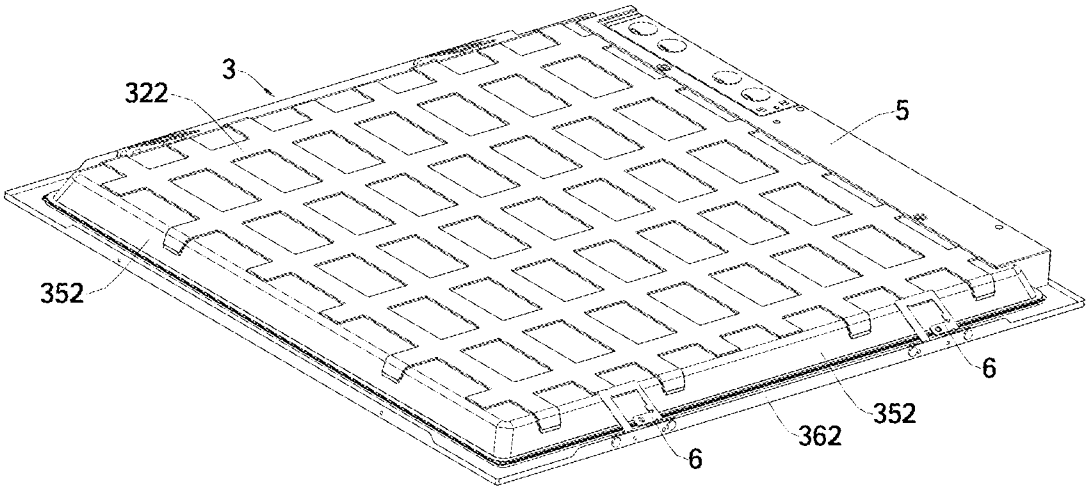
FIG. 1 illustrates a back perspective diagram of a lighting apparatus embodiment.

FIG. 1 illustrates a back perspective diagram of a lighting apparatus embodiment. In FIG. 1, the lighting apparatus 3 has a driver module and a main part. The main part is attached to a platform via hooks 6. The main part has a base tray 352. The base tray 352 has a bottom plate 322 and a folded structure 362.

Figure 2:
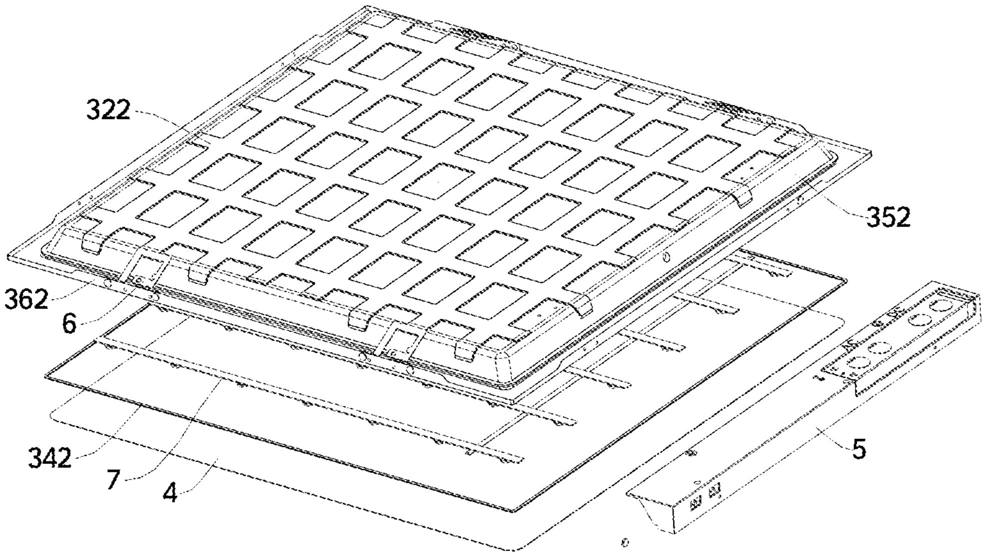
FIG. 2 illustrates an exploded view of the example in FIG. 1.

FIG. 2 illustrates an exploded view of the example in FIG. 1. In FIG. 2, in addition to the components already mentioned above, light strips 7 are placed on the base plate 322. The optical plate 4 is stacked with a waterproof adhesive tape 342.

Figure 3:
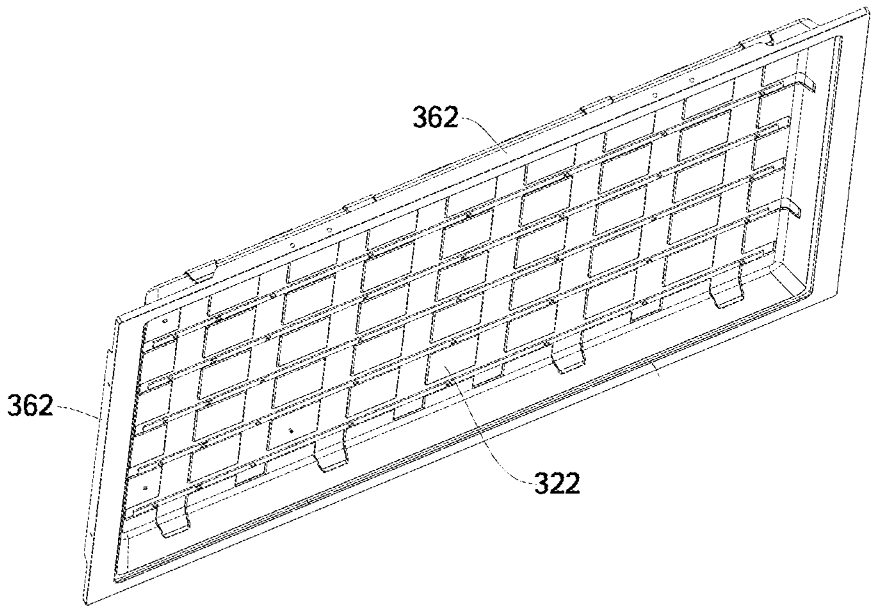
FIG. 3 illustrates a perspective view of a bottom tray example.

FIG. 3 illustrates a perspective view of a bottom tray example. In FIG. 3, the folded structure 362 has a base plate 322 for disposing light strips. There are some groove 323 or ribs for placing light strips.

Figure 4:
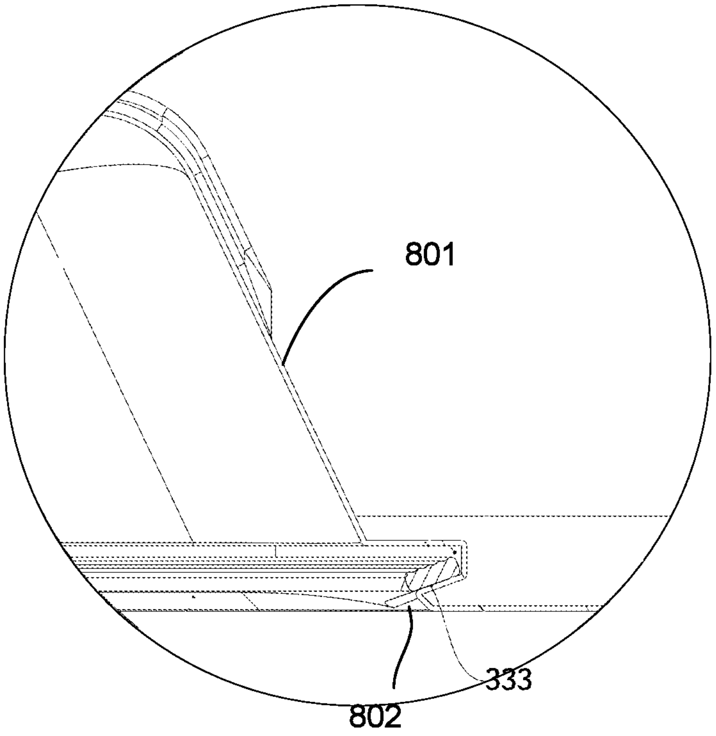
FIG. 4 illustrates a zoom-up view of a cross-sectional view of a connection of components.

FIG. 4 illustrates a zoom-up view of a cross-sectional view of a connection of components. In FIG. 4, the lateral wall 801 is extended with a folded structure 802. There is a waterproof adhesive tape 333 forming a loop placed in the folded structure 802.

FIG. 5 illustrates a zoom-up view of a cross-sectional view of a connection of components during assembly. An optical plate 966 is deformed and placed into the folded structure 802 to engage the waterproof adhesive tape 333.

Figure 6:
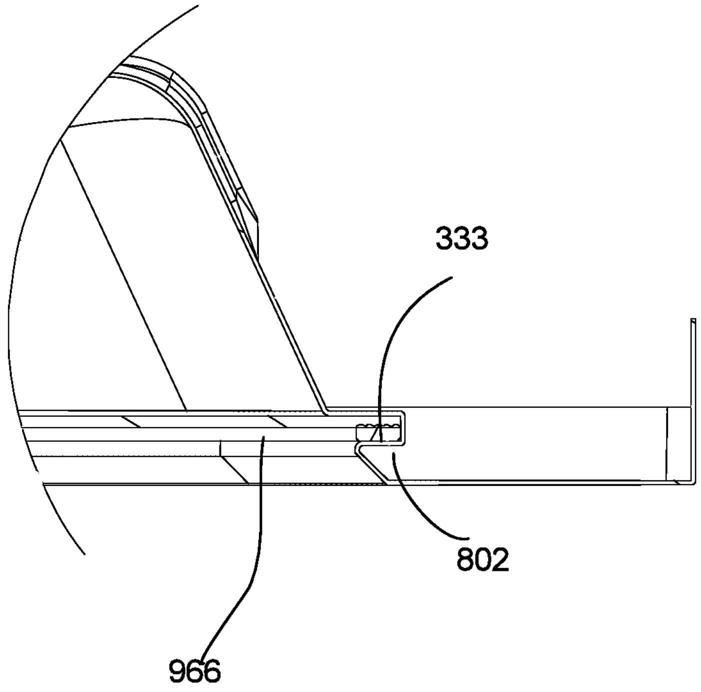
FIG. 6 illustrates another example of a zoom-up view of components.

FIG. 6 illustrates another example of a zoom-up view of components. In FIG. 6, by using a forming fixture, the folded structure 802 as well as the portion of the optical plate 966 and the waterproof adhesive tape 33 are bent to fasten the optical plate 966 to the folded structure 802.

Figure 7:
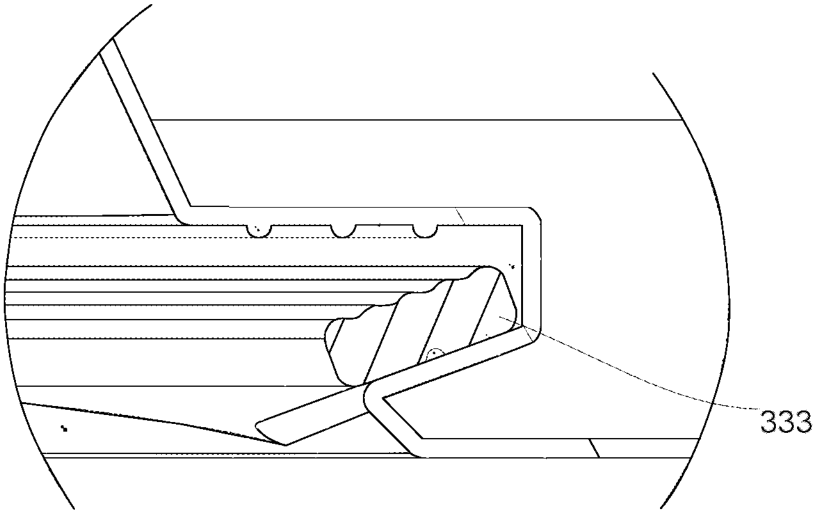
FIG. 7 illustrates another example of a zoom-up view of components.

FIG. 7 illustrates another example of a zoom-up view of components. In FIG. 7, the waterproof adhesive tape 333 is placed for performing the function of waterproof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source placed upon a bottom plate;

a bottom tray with the bottom plate, a lateral wall and a folded structure, wherein the lateral wall defines a light opening, wherein the folded structure is disposed at a top edge of the lateral wall;

an optical plate placed to cover the light opening to change a light parameter of a light emitted from the light source; and a waterproof adhesive tape, wherein at least a portion of the waterproof adhesive tape and a peripheral edge of the optical plate are stacked together to be fastened by the folded structure of the bottom tray, wherein there are multiple grooves disposed on the bottom plate, wherein the light source comprises multiple light strips, wherein the light strips are respectively disposed to the grooves, wherein each light strip has a lens cover, wherein the lens cover has a buckle unit for buckling to the bottom plate.

2. The lighting apparatus of claim 1, further comprising a driver module attached to an exterior side of the lateral wall of the bottom tray.

3. The lighting apparatus of claim 2, wherein the driver module is installed by sliding into a track of the bottom tray.

4. The lighting apparatus of claim 3, wherein the track has an electrode and a buckle, wherein when the driver module is moved to the electrode, the buckle secures an electrical contact between the driver module and the light source via the electrode.

5. The lighting apparatus of claim 2, wherein the driver module has a window for exposing a sensor to collect ambient information to be processed by the driver module.

6. The lighting apparatus of claim 5, wherein the window is also used for exposing an antenna for wireless communication of the driver module.

7. The lighting apparatus of claim 1, wherein the folded structure defines a surrounding U-shaped clip, wherein the portion of the waterproof adhesive tape and the peripheral edge of the optical plate are clipped inside the U-shaped clip.

8. The lighting apparatus of claim 7, wherein the folded structure is the topmost component, and there is no other frame to cover this folded structure.

9. The lighting apparatus of claim 8, wherein the folded structure construct a surrounding frame.

10. The lighting apparatus of claim 1, wherein areas defined by the lateral wall of the bottom tray increases gradually from the bottom plate of the bottom tray to the folded structure of the bottom tray.

11. The lighting apparatus of claim 10, wherein a rate of increase of at the areas becomes greater as the areas get closer to the folded structure.

12. The lighting apparatus of claim 11, wherein a ratio of a lateral wall height to a length of the bottom plate is less than 1/50.

13. The lighting apparatus of claim 1, wherein a concave platform is disposed at a center of the bottom plate, wherein a driver module is placed on the concave platform, wherein at least of a portion of the driver module is placed in a lower height position compared with the light strips.

14. The lighting apparatus of claim 1, wherein there are multiple ribs raised from the bottom plate, wherein the light source has multiple light strips placed on the ribs.

15. The lighting apparatus of claim 1, wherein a forming fixture is used for deforming the folding structure when the portion of the waterproof adhesive tape and the peripheral edge of the optical plate is placed in the folder structure to also deform the portion of the waterproof adhesive tape and the peripheral edge of the optical plate to fasten the optical plate with the bottom plate.

16. The lighting apparatus of claim 15, wherein the waterproof adhesive tape is a rubber loop.

17. The lighting apparatus of claim 1, wherein the optical plate is a diffusion panel.

18. The lighting apparatus of claim 1, wherein the optical plate contains multiple diffusion particles, wherein the multiple diffusion particles have a diameter less than 0.1 mm.

* * * * *